United States Patent Office 2,757,153
Patented July 31, 1956

2,757,153

PROCESS FOR WATER-SOLUBLE STYRENE-MALEIC ANHYDRIDE DERIVATIVES

Albert H. Bowen, Seattle, Wash., assignor to Monsanto Chemical Company, St. Louis, Mo., a corporation of Delaware No Drawing. Application December 14, 1949,
Serial No. 133,001

15 Claims. (Cl. 260—29.6)

This invention relates to an improved process for the rapid production of water-soluble alkaline salts of styrene-maleic anhydride heteropolymer and simultaneous rapid transfer of said heteropolymer from a water-immiscible aromatic solvent phase to an aqueous phase and rapid phase separation.

The solvent-non-solvent polymerization process entails the used of a water-immiscible aromatic solvent, such as xylene, benzene, and toluene which are solvents for the monomers but are non-solvents for the heteropolymer, thus as polymerization proceeds the product continually precipitates from solution providing a relatively uniform material. The solvent can be freed from the heteropolymer by settling, centrifuging and filtering processes with subsequent further treatment of the resultant slurry. The slurry still contains a large quantity of solvent which may be removed in varying degrees by processes such as distillation under vacuum with or without subsequent vacuum oven drying, and steam distillation. It is often difficult to completely remove all of the solvent without drastic and lengthy treatment since the heteropolymer tends to become solvated. The above methods may be hazardous and relatively expensive since they require special equipment for handling highly inflammable solvent vapors.

Since currently a large portion of the styrene-maleic anhydride heteropolymer is ultimately used in the form of its water-soluble salts, it has been found desirable to employ a leaching process whereby the heteropolymer is made water-soluble and thereby be transferred from the water-immiscible solvent to the aqueous phase. The solvent is thus freed from the heteropolymer and the two phases can be readily separated by less hazardous and expensive methods than formerly employed.

Heretofore partial inorganic, alkali-metal base salts of styrene-maleic anhydride have been prepared by a lengthy process employing sufficient base to form from about the 5 to about the 17 percent neutralized salt during a three-hour digestion period with slow agitation, then the materials were allowed to stand for about eight hours to effect phase separation and the aqueous phase removed, the weight ratio of water to styrene-maleic anhydride being substantially 6:1 during this initial digestion and separation. Then additional base was added to form the approximately 50 percent neutralized salt and the mixture was digested at 85 to 90° C. for an additional six hours. Thus, the salt formation and separation steps require seventeen hours and must be closely controlled to avoid emulsification. The initial base addition must be kept small and the agitation must be slow to prevent emulsion formation. Where these precautions have not been observed, emulsions which were extremely difficult to break have been formed, thus the advantages of the process can be easily lost.

It is an object of this invention to rapidly produce substantially completely neutralized water-soluble salts of styrene-maleic anhydride without danger of emulsification even with vigorous agitation, and effect rapid phase separation.

Another object of this invention comprises producing substantially completely neutralized water-soluble salts of solvent-non-solvent process styrene-maleic anhydride heteropolymer by adding water and a base to the heteropolymer and water-immiscible aromatic solvent, the water being sufficient to effect the transfer of the hydrophilic heteropolymer salt to the aqueous phase without excess water to form an emulsion when the system is subject to vigorous agitation.

It has now been found that substantially completely neutralized styrene-maleic anhydride heteropolymer can be rapidly formed and separated from an aromatic solvent-non-solvent polymerization mixture. This process entails the transfer of the heteropolymer to an aqueous phase by high-speed agitation of the solvent phase during addition of the basic aqueous phase. The agitation is continued for a short time, say approximately ten minutes, then discontinued and the two phases rapidly separate. This discovery is very unexpected in view of the prior art teaching that the heteropolymer can be only partially neutralized and agitation should be slow to avoid emulsion formation.

The novel process of this invention can be employed with the entire solvent-non-solvent polymerization reaction mixture or said mixture may be allowed to stand a short time and a portion of the water-immiscible solvent removed. The water-soluble salt of styrene-maleic anhydride can be shipped as the concentrated solution or can be dried.

The water-solubilizing base employed should be selected from the group consisting of ammonium hydroxide, sodium hydroxide, and potassium hydroxide. The preferred range of base is from about 2 to about 3 moles of base per mole of styrene-maleic anhydride heteropolymer unit, the higher ratios being preferred for the volatile base and the lower ratios being preferred for the non-volatile bases. The pH of the styrene-maleic anhydride salt solutions may be from about 7 to about 10.

The total water present in the system after the heteropolymer is substantially completely neutralized should be within the range of from about 1 to about 2.5 and preferably from about 1 to about 2 parts by weight of water per part by weight of styrene-maleic anhydride. The lower limit of about 1 part by weight of water per part by weight of heteropolymer is required in order to provide sufficient aqueous phase to effect heteropolymer transfer. The upper limit of about 2.5 should not be exceeded because it is desired to maintain the resultant heteropolymer salt solution at a sufficiently high concentration to provide economical handling without necessarily requiring a subsequent drying operation; and more important, further decrease of phase volume ratio of solvent to water increases the danger of emulsification and would thus require mild agitation losing the advantage of rapid neutralization and separation.

In general the solvent-non-solvent process employs from about 7 to about 9 parts by weight of solvent per part by weight of monomers. Since the weight of monomers and ultimate heteropolymer produced from same are substantially equivalent, the parts by weight of water and solvent can be directly compared. Thus, employing the above range of from about 1 to about 2.5 parts by weight of water per part by weight of heteropolymer, it is seen that the solvent can range from about 3 to about 10.5 parts by volume per part by volume of water; however, it is preferred that the volume ratio be kept towards the high side, say above about 5. Higher solvent to water volume ratios may be successfully employed, as for example if a heteropolymer were produced in a 5 percent system, that is 19 parts by weight of solvent per part by weight of monomers, the ultimate phase volume of solvent to water would range from about 22 to about 8.8, where the solvent is xylene, depending on whether the limit of 1 or 2.5 parts by weight of water per part by weight of heteropolymer was employed. However, in general the aforementioned example would be uneconomical in comparison to polymerization processes employing higher total solids and is submitted only to point out that the upper range of the solvent to water phase volume relationship is less important than the lower range.

Where a portion of the water-immiscible solvent is removed prior to the addition of the water and base, care should be taken that the ultimate total water simultaneously satisfies the limits based on heteropolymer parts by weight and solvent phase volume. In general, this will tend to require that the lower range limits be employed. Thus, it is preferred that the heteropolymer slurry should not be overly concentrated in order that a subsequent rapid and clean separation of the two phases may be realized.

The styrene-maleic anhydride heteropolymer is preferably prepared from a monomer mole ratio of substantially 1:1. Thus, the "heteropolymer unit" has a molecular weight of 202 and the structure:

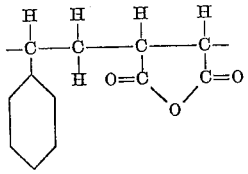

The following examples are illustrative of the invention:

*Example 1*

A styrene-maleic anhydride heteropolymer was prepared by the solvent-non-solvent process wherein 1242 lb. of xylol was introduced into a steam-jacketed reactor, equipped with a reflux condenser, and 67 lb. of maleic anhydride and 35 lb. of monomeric styrene added thereto. The reaction mixture was heated to 110° C. with agitation. Then heating was discontinued and 36 lb. of monomeric styrene containing 188 g. of benzoyl peroxide was introduced into the reactor. The temperature rose to about 127° C. due to the exothermic reaction. Heat was again applied to the reactor to maintain a temperature of about 133° C. After a reaction time of about 1.25 hours the heat was turned off and the reaction mixture cooled.

The polymerization process may, of course, be varied according to the prior art, the above example merely being illustrative of one suitable process.

*Example 2*

The final reaction mixture of a solvent-non-solvent polymerization process containing 22 parts of styrene-maleic anhydride heteropolymer and 178 parts of xylene was placed in a high-speed mixer and 11.5 parts of water added thereto. Then 18 parts of ammonium hydroxide (28% NH₃) were added with vigorous agitation and the agitation continued for about five minutes, the temperature being about 90° C. When the agitation was discontinued, the styrene-ammonium maleate solution and xylol phases immediately separated into clearly defined layers and the xylol layer poured off after several minutes, leaving a viscous concentrated solution of styrene-ammonium maleate having a pH of about 9. The heteropolymer salt solution can be poured while hot, but becomes a gel-like semi solid on cooling. The heteropolymer salt solution can be diluted with water to any desirable concentration after separation of the aromatic solvent, thus the heteropolymer salt can be shipped as a concentrated solution, a gel-like semi solid, or can be dried to a white solid, as for example by drum drying.

From the above it may be readily calculated that 2.7 moles of ammonium hydroxide were employed per mole of heteropolymer unit, the ultimate water present in the system was about one part by weight per part by weight of heteropolymer, and the phase volume of xylene to water was 9.15.

*Example 3*

One hundred parts by weight of the final reaction mixture of a solvent-non-solvent polymerization process, wherein the solvent was benzene and the mixture contained 10.6 percent by weight of styrene-maleic anhydride heteropolymer, was placed in a high-speed mixer. Then 9 parts (2.8 moles per mole of heteropolymer unit) by weight of ammonium hydroxide (28% NH₃) and 16 parts of water were added thereto and the mixture vigorously agitated for about five minutes at a temperature of about 75° C. Upon termination of agitation the styrene-ammonium maleate solution and benzene phases rapidly separated into clearly defined layers. The benzene layer was poured off after about ten minutes, leaving a viscous concentrated solution of styrene-ammonium maleate which may be poured while hot but becomes a gel-like semi solid upon cooling. The weight ratio of water to heteropolymer was about 2 and the phase volume of benzene to water was about 4.7.

Obviously the maximum polymerization and digestion temperatures will be dependent on the choice of solvent. For example, the polymerization and digestion temperatures may be about 135 and 90° C., 110 and 90° C., and 80 and 70° C., respectively for xylol, toluol, and benzol. In general polymerization is carried out at or near reflux temperature, but lower temperatures may be employed over a longer period of time. Also to provide rapid digestion it is preferred that heat be employed to accelerate the reaction but the temperature should preferably be held about 5 to 10° C. below the boiling point of the lowest boiling point liquid in the mixture. Lower digestion temperatures may be employed but require somewhat longer periods of agitation to assure substantially complete neutralization of the heteropolymer. The polymerization mixture should be cooled sufficiently prior to the addition of the water and base to avoid boiling of the mixture as the temperature rises from the exothermic heat of neutralization.

The choice of treatment of the hot viscous concentrated heteropolymer salt solution after separation from the aromatic solvent is dependent on the intended application of the heteropolymer salt and the overall economic considerations. For example, where the salt solution is to be utilized a short distance from the point of manufacture it may be preferable to further dilute the solution to a total solids concentration of about 25 to 35 percent to maintain fluidity at normal temperatures. On the other hand, where weight is important, as in shipping relatively long distances, it may be preferable to ship the salt as the gel-like semi-solid and dilute at the destination by heating the semi-solid until fluid and adding the desired quantity of water thereto with agitation or other suitable procedures; or where the salt will be employed in a dry formulation, shipment of the dried salt may be preferable.

I claim:

1. The process of treating a solvent-non-solvent process styrene-maleic anhydride heteropolymer suspended in a water-immiscible aromatic solvent, wherein the said aromatic solvent is a solvent for the monomers and a non-solvent for the heteropolymer, comprising the addition of water such that the final total water present in the system will be from about 1 to about 2.5 parts by weight of water per part by weight of heteropolymer, and from about 2 to about 3 moles, per mole of heteropolymer unit, of a base from the group consisting of ammonium hydroxide, sodium hydroxide, and potassium hydroxide, to the heteropolymer-solvent mixture while rapidly agitating same and the digestion temperature of the said mixture is held at from about 70° C. to about 90° C., whereby the heteropolymer is substantially completely neutralized in up to about 10 minutes rendering same hydrophilic, whereby transferring the heteropolymer to the aqueous phase which rapidly and cleanly separates from the water-immiscible aromatic solvent upon termination of agitation, enabling simple recovery of the aromatic solvent and the heteropolymer salt solution.

2. The process of claim 1 wherein the base is ammonium hydroxide.

3. The process of claim 1 wherein the base is sodium hydroxide.

4. The process of treating a solvent-non-solvent process styrene-maleic anhydride heteropolymer suspended in a water-immiscible aromatic solvent, wherein the said aromatic solvent is a solvent for the monomers and a non-solvent for the heteropolymer, comprising the addition of water such that the final total water present in the system will be from about 1 to about 2.5 parts by weight of water per part by weight of heteropolymer, which water addition simultaneously satisfies the limits of from about 3 to about 10.5 parts by volume of solvent per part by volume of water, and from about 2 to about 3 moles, per mole of heteropolymer unit, of a base from the group consisting of ammonium hydroxide, sodium hydroxide, and potassium hydroxide, to the heteropolymer-solvent mixture while rapidly agitating same and the digestion temperature of the said mixture is held at from about 70° C. to about 90° C., whereby the heteropolymer is substantially completely neutralized in up to about 10 minutes rendering same hydrophilic, thereby transferring the heteropolymer to the aqueous phase which rapidly and cleanly separates from the water-immiscible aromatic solvent upon termination of agitation, enabling simple recovery of the aromatic solvent and the heteropolymer salt solution.

5. The process of claim 4 wherein the base is ammonium hydroxide.

6. The process of claim 4 wherein the base is sodium hydroxide.

7. The process of treating a solvent-non-solvent process styrene-maleic anhydride heteropolymer suspended in a water-immiscible aromatic solvent, wherein the said aromatic solvent is a solvent for the monomers and a non-solvent for the heteropolymer, comprising the addition of water such that the final total water present in the system will be from about 1 to about 2.5 parts by weight of water per part by weight of heteropolymer, which water addition simultaneously satisfies the limits of from about 5 to about 10.5 parts by volume of solvent per part by volume of water, and from about 2 to about 3 moles, per mole of heteropolymer unit, of a base from the group consisting of ammonium hydroxide, sodium hydroxide, and potassium hydroxide, to the heteropolymer-solvent mixture while rapidly agitating same and the digestion temperature of the said mixture is held at from about 70° C. to about 90° C., whereby the heteropolymer is substantially completely neutralized in up to about 10 minutes rendering same hydrophilic, thereby transferring the heteropolymer to the aqueous phase which rapidly and cleanly separates from the water-immiscible aromatic solvent upon termination of agitation, enabling simple recovery of the aromatic solvent and the heteropolymer salt solution.

8. The process of claim 7 wherein the base is ammonium hydroxide.

9. The process of claim 7 wherein the base is sodium hydroxide.

10. The process of treating a solvent-non-solvent process styrene-maleic anhydride heteropolymer suspended in a water-immiscible aromatic solvent, wherein the said aromatic solvent is a solvent for the monomers and a non-solvent for the heteropolymer, comprising the addition of water such that the final total water present in the system will be from about 1 to about 2.5 parts by weight of water per part by weight of heteropolymer, which water addition simultaneously is greater than about 5 parts by volume of solvent per part by volume of water, and from about 2 to about 3 moles, per mole of heteropolymer unit, of a base from the group consisting of ammonium hydroxide, sodium hydroxide, and potassium hydroxide, to the heteropolymer-solvent mixture while rapidly agitating same and the digestion temperature of the said mixture is held at from about 70° C. to about 90° C., whereby the heteropolymer is substantially completely neutralized in up to about 10 minutes rendering same hydrophilic, thereby transferring the heteropolymer to the aqueous phase which rapidly and cleanly separates from the water-immiscible aromatic solvent upon termination of agitation, enabling simple recovery of the aromatic solvent and the heteropolymer salt solution.

11. The process of treating a solvent-non-solvent process styrene-maleic anhydride heteropolymer suspended in a water-immiscible aromatic solvent, wherein the said aromatic solvent is a solvent for the monomers and a non-solvent for the heteropolymer, comprising the addition of water such that the final total water present in the system will be from about 1 to about 2 parts by weight of water per part by weight of heteropolymer, which water addition simultaneously satisfies the limits of from about 5 to about 10.5 parts by volume of solvent per part by volume of water, and from about 2 to about 3 moles, per mole of heteropolymer unit, of a base from the group consisting of ammonium hydroxide, sodium hydroxide, and potassium hydroxide, to the heteropolymer-solvent mixture while rapidly agitating same and the digestion temperature of the said mixture is held at from about 70° C. to about 90° C., whereby the heteropolymer is substantially completely neutralized in up to about 10 minutes rendering same hydrophilic, thereby transferring the heteropolymer to the aqueous phase which rapidly and cleanly separates from the water-immiscible aromatic solvent upon termination of agitation, enabling simple recovery of the aromatic solvent and the heteropolymer salt solution.

12. The process of claim 11 wherein the base is ammonium hydroxide.

13. The process of claim 11 wherein about 2 moles of sodium hydroxide are employed per mole of heteropolymer unit.

14. The process of claim 11 wherein the aromatic solvent is xylene and the digestion temperature is about 90° C.

15. The process of claim 11 wherein the aromatic solvent is benzene and the digestion temperature is about 75° C.

References Cited in the file of this patent

UNITED STATES PATENTS

| | | |
|---|---|---|
| 2,286,062 | Condo et al. | June 9, 1942 |
| 2,313,728 | Austin et al. | Mar. 16, 1943 |
| 2,430,313 | Vana | Nov. 4, 1947 |
| 2,490,489 | Tauch | Dec. 6, 1949 |
| 2,565,147 | Pfluger | Aug. 21, 1951 |